United States Patent
Neglur

(10) Patent No.: US 9,832,379 B1
(45) Date of Patent: Nov. 28, 2017

(54) DISCONTINUOUS TRANSMISSION OF IMAGES

(71) Applicant: Amazon Technologies, Inc., Seattle, WA (US)

(72) Inventor: Smita Neglur, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/639,424

(22) Filed: Mar. 5, 2015

(51) Int. Cl.
*H04N 5/232* (2006.01)
*H04N 5/357* (2011.01)
*H04N 5/369* (2011.01)

(52) U.S. Cl.
CPC ......... *H04N 5/23241* (2013.01); *H04N 5/357* (2013.01); *H04N 5/369* (2013.01)

(58) Field of Classification Search
CPC .................................................. H04N 5/23241
See application file for complete search history.

(56) References Cited

U.S. PATENT DOCUMENTS

| | | | | |
|---|---|---|---|---|
| 2004/0160525 A1* | 8/2004 | Kingetsu | ............ | H04N 5/23248 348/364 |
| 2005/0268127 A1* | 12/2005 | Shiba | ................. | H04N 1/00928 713/320 |
| 2007/0024737 A1* | 2/2007 | Nakamura | ......... | H04N 5/23293 348/335 |
| 2007/0285529 A1* | 12/2007 | Imamura | ................ | H04N 9/045 348/222.1 |
| 2008/0002050 A1* | 1/2008 | Min | ..................... | H04N 5/2252 348/372 |
| 2011/0157460 A1* | 6/2011 | Kim | ...................... | H04N 5/232 348/372 |
| 2013/0235239 A1* | 9/2013 | Wu | .................... | H04N 5/23241 348/302 |

* cited by examiner

*Primary Examiner* — Ahmed A Berhan
(74) *Attorney, Agent, or Firm* — Pierce Atwood LLP

(57) ABSTRACT

Devices, systems and methods are disclosed for discontinuously capturing and transmitting images from a camera. The camera initializes and powers down on-demand components, awaiting a signal on an interrupt pin. Upon receiving a signal on the interrupt pin, the camera powers up the on-demand components, captures a series of images and transmits the series of images. The discontinuous transmission of images allows the camera to reduce a power consumption and a memory usage while reducing a latency between a capture request and the transmission of images.

20 Claims, 7 Drawing Sheets

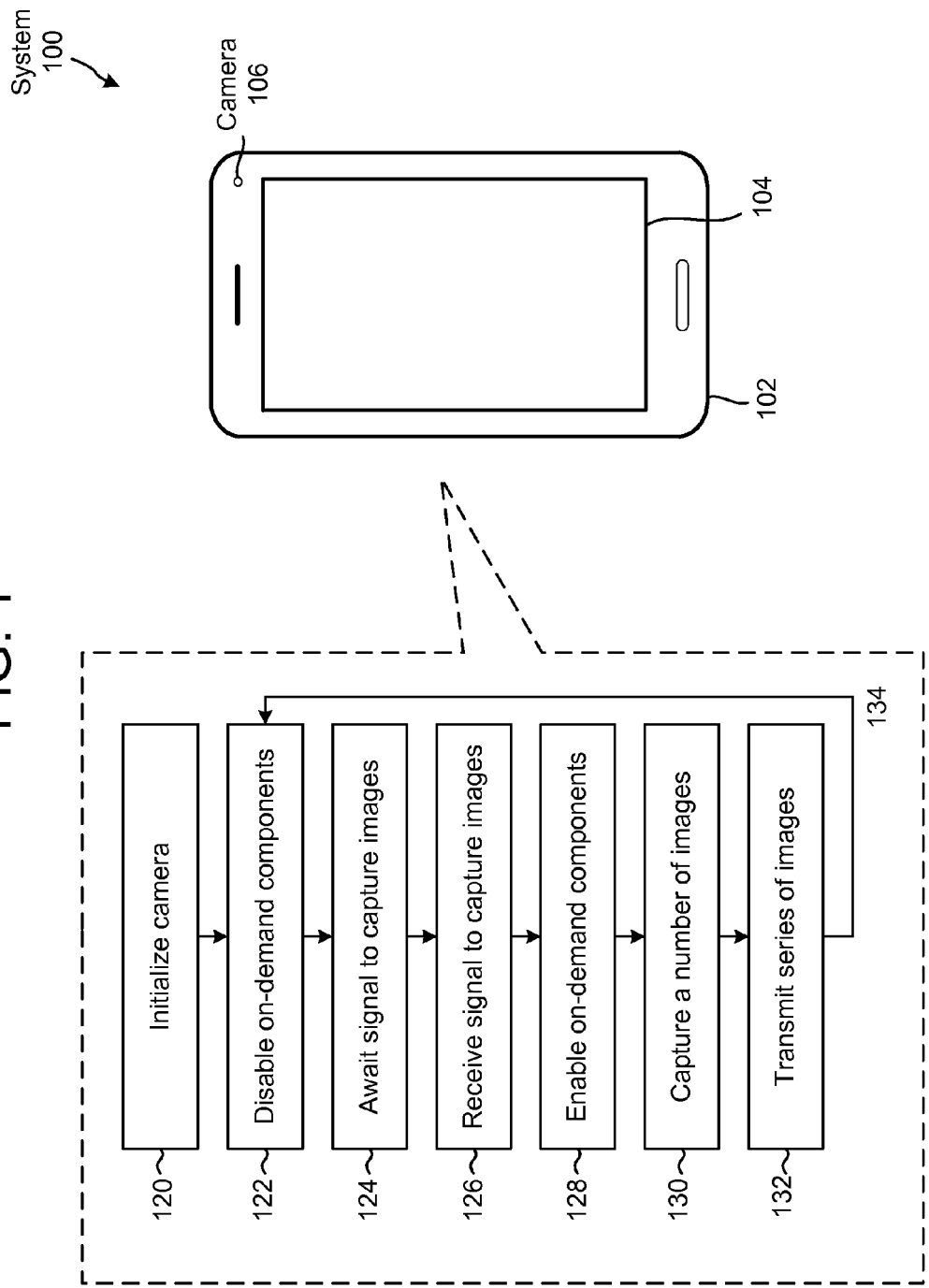

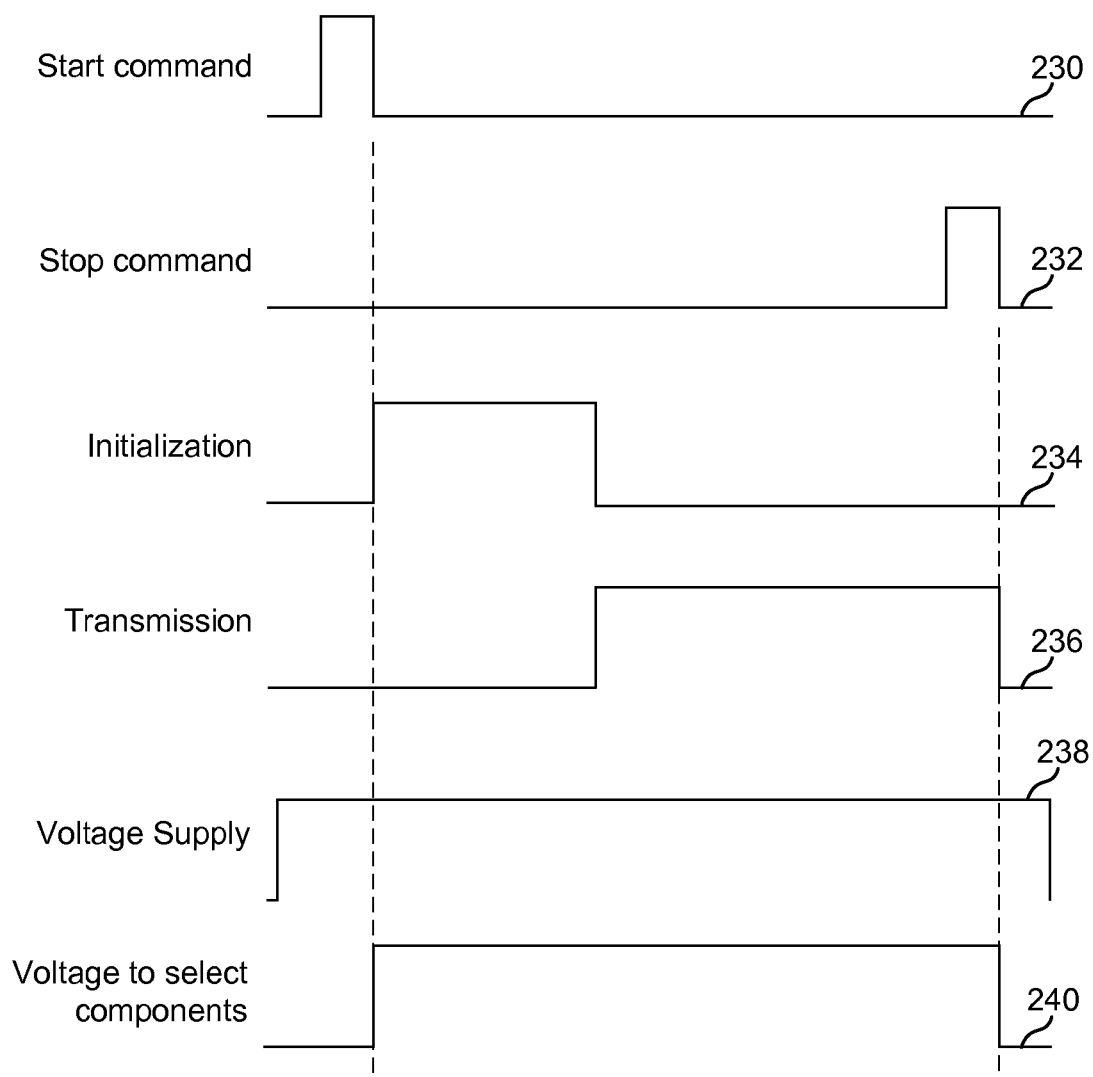

| 410 | Voltage Rails | Always on |
| 412 | Functional Blocks | Enabled during image capture |
| 414 | MIPI Data | Enabled during image capture |
| 416 | MIPI Clock | Enabled during image capture |
| 418 | Registers | Initialized to stream N frames |
| 420 | Image Signal Processing | Enabled during image capture |

DISCONTINUOUS TRANSMISSION OF IMAGES

BACKGROUND

With the advancement of technology, the use and popularity of electronic devices has increased considerably. Electronic devices are commonly used to capture images and some electronic devices may use image sensors to obtain information about the surrounding environment.

BRIEF DESCRIPTION OF DRAWINGS

For a more complete understanding of the present disclosure, reference is now made to the following description taken in conjunction with the accompanying drawings.

FIG. 1 illustrates an overview of a system for implementing embodiments of the present disclosure.

FIGS. 2A-2C illustrate examples of a state diagram, a flowchart and a timing chart used for continuous transmission of images.

DETAILED DESCRIPTION

Figure 2A:
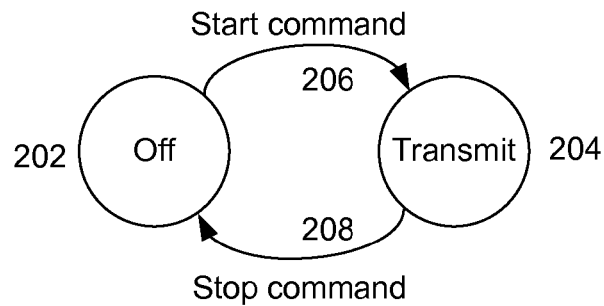

Electronic devices are commonly used to capture images. Image capture may be based on user input (for example, a user taking a picture) or may occur in the background (for example when a camera image feed is used to obtain information about a surrounding environment). Typically, cameras in certain devices continuously transmit images when the cameras are on. This allows devices to quickly capture pictures when instructed to do so. When the camera of a device is not in use, however, it may be switched off to reduce power consumption. To enable the camera to transmit images, the camera may be controlled by setting a bit to start or stop continuous transmission of images. For example, an application running on a host processor in the device sends a request to enable transmission of images to start the camera. In response to the request, the camera is powered on and the camera continuously transmits images until the application sends a command to stop image transmission. Thus, the camera continuously transmits images when in use and is turned off to reduce power consumption when not in use. One problem with powering off a camera as is typically done, is that turning on the camera may result in a delay between requesting transmission of images and the camera actually transmitting the images. Offered is a method to discontinue continuous transmission of camera images, thus saving power. Also offered is a method to partially, but not fully, power down certain camera components, allowing for faster activation of the camera when images are desired. Thus, when images from a device's camera are needed, there is less of a delay, but there is also sufficient power savings from not keeping all camera components fully powered at all times.

To reduce power consumption and memory usage associated with capturing images, devices, systems and methods are disclosed for discontinuous image data transmission. For example, a camera may be configured with a special discontinuous mode, where the camera is at least partially powered on but does not continuously transmit images, thus saving power that would otherwise have been used during image transmission. In response to a signal (such as an interrupt) requesting images, the camera transmits a certain number of images before again halting image transmission. While in the discontinuous mode, no data transmission occurs while the camera waits for an activation signal from a host processor. A dedicated pin may be configured to communicate the signal (such as an interrupt) from the host processor to the camera. Once the signal is received, the camera may power on any disabled camera components and capture, process and transmit a certain number of image frames and then stop transmission after the series of frames is transmitted. Therefore, the discontinuous mode may reduce a power consumption and memory usage of the camera as the camera is not transmitting images after the series of frames is transmitted and may disable certain camera components. In addition, a latency of the camera is reduced as camera initialization (described below) is performed upon entering the discontinuous mode. Thus, upon receiving the signal to transmit images, the camera may transmit a first frame of the series of frames without requiring an additional time-intensive initialization. Further, the discontinuous mode may be configured so that certain components or functional blocks in the camera and camera-related circuitry are disabled when not being used and waiting for the interrupt. Therefore, the camera may be enabled during the discontinuous mode to capture images, with only a brief delay between receiving the activation signal and capturing the first frame, without increasing a power consumption of the device.

FIG. 1 illustrates an overview of a system 100 for implementing embodiments of the present disclosure. The system 100 includes a device 102, such as a smart phone, having a display 104 and a camera 106. However, the present disclosure is not limited thereto and the device 102 may be any electronic device including a processor and at least one camera.

The device 102 may initialize (120) the camera 106, putting the camera 106 in a discontinuous mode. For example, the device 102 may prepare the camera 106 to capture images, such as by setting an exposure, a frame rate, a resolution, a data format, a number of images in a series of images and/or other camera settings for capturing images. The device 102 may then disable (122) on-demand components to reduce power consumption of the device 102, as the camera 106 is not transmitting images. The on-demand components are components associated with the camera 106 that are not required until the camera 106 is capturing, processing and transmitting images, and may therefore be disabled by storing setting values to registers, gating the registers and removing power to the on-demand components. The on-demand components may include image signal processing (ISP) functionality (e.g., lens correction, pixel correction or the like), a phase-locked loop (PLL) clock, functional blocks included in the camera 106, components or circuitry associated with a camera interface, or the like. Examples of camera interface components that may be disabled (i.e., powered down) may include circuitry associated with Camera Serial Interface (CSI), which was created by the Mobile Industry Processor Interface (MIPI) alliance, and may include, for example, a MIPI clock and MIPI data signals, although the camera interface is not limited thereto. While FIG. 1 illustrates steps 120 and 122 as discrete steps, the camera 106 may disable some or all of the on-demand components as part of the initialization performed in step 120 without departing from the disclosure.

The device 102 may await (124) a signal to capture a series of images. While awaiting the signal, on-demand components or functional blocks in the camera 106 and other camera-related circuitry may remain disabled, reducing a power consumption of the device 102. In some examples, image sensor(s) included in the camera 106 may be enabled to reduce a delay between receiving an image capture request and capturing the series of images. However, the present disclosure is not limited thereto and the image sensor(s) may be disabled along with the on-demand components.

At a later point in time, the device 102 may receive (126) a signal triggering the camera 106 to capture the series of images. The signal may be sent from a host processor within the device 102 to the camera 106 based on user input (e.g., a user pushing a button), detected motion (e.g., movement of the device 102 being detected by an accelerometer or the like) or a request from an application (e.g., an application requests images for use in facial recognition or the like), although the disclosure is not limited thereto. In response to the signal, the device 102 may enable (128) the on-demand components and any other disabled components of the camera 106 required for image capture, processing and transmission, which may include the image signal processing (ISP) functionality, the phase-locked loop (PLL) clock, the functional blocks included in the camera 106, and/or circuitry associated with the MIPI interface, such as the MIPI clock and the MIPI data signals. The device 102 may capture (130) a number of images in a series and may transmit (130) the series of images, for example to the host processor and/or applications requesting the images. After transmitting the series of images, the device 102 may loop (134) to step 122 to disable the on-demand components and await another signal to capture images.

When the device 102 disables a component or disables power to the component, the device 102 is turning off, powering off or otherwise disabling the component so that the component does not consume power. For example, the on-demand components are not used when the camera 106 is not capturing, processing and transmitting images, so these on-demand components may be disabled to reduce a power consumption of the device 102. However, in the discontinuous mode, the camera 106 may remain enabled and configured to capture images after only a brief delay to enable the on-demand components upon receiving the signal requesting the camera 106 to capture images. When necessary, setting values and other key data may be saved to registers and maintained during the disabled state so that the setting values may be loaded into the on-demand components after the on-demand components are enabled.

FIG. 1 describes the signal requesting that the camera 106 captures a number of images in a series. The series of images may include n images (or frames), where n is a natural number. For example, the signal may request that the camera 106 captures a single image if n=1. Alternatively, the camera 106 may capture any number of images in response to the signal. The number of images in a series may be predetermined, or may be altered as part of a setting or configuration of the device, such as part of camera settings stored in the camera 106, such as in register(s) of the camera 106. A user or an application may change the camera settings, such as the number of images in a series and thus may update the camera settings in the register(s). For example, a first application may require a first number of images (e.g., 1 image) to perform a first analysis (e.g., facial tracking or the like), whereas a second application may require a second number of images (e.g. 10 images) to perform a second analysis (e.g., analyzing an environment around the device 102). Alternatively, the user and/or applications may change other camera settings such as an exposure, a frame rate, a resolution, a data format or the like. Those camera settings may also be stored in register(s) of the camera to allow for quick image capture upon receipt of the activation signal.

The discontinuous mode described above may offer power savings over a traditional continuous transmission mode. FIG. 2A illustrates an example of a state diagram associated with a camera continuously transmitting images. FIG. 2A is intended to convey a broad example of a state diagram, and cameras may include additional states not illustrated in FIG. 2A. When the camera is not in use, the camera is in an "off" state 202. In some camera state diagrams, the "off" state 202 may correspond to a "ready" state, but the camera itself is powered down. In the off state the camera does not capture images, leading to low power usage but also requiring more time to fully activate when receiving a start command. The start command may be received by an application on the device 102 and may be transmitted to the camera, for example to capture images to be displayed using the application. Upon receiving the start command 206, the camera switches to a "transmit" state 204 and remains in the "transmit" state 204 until receiving a stop command 208, at which point the camera reverts to the "off" state 202.

Figure 2B:
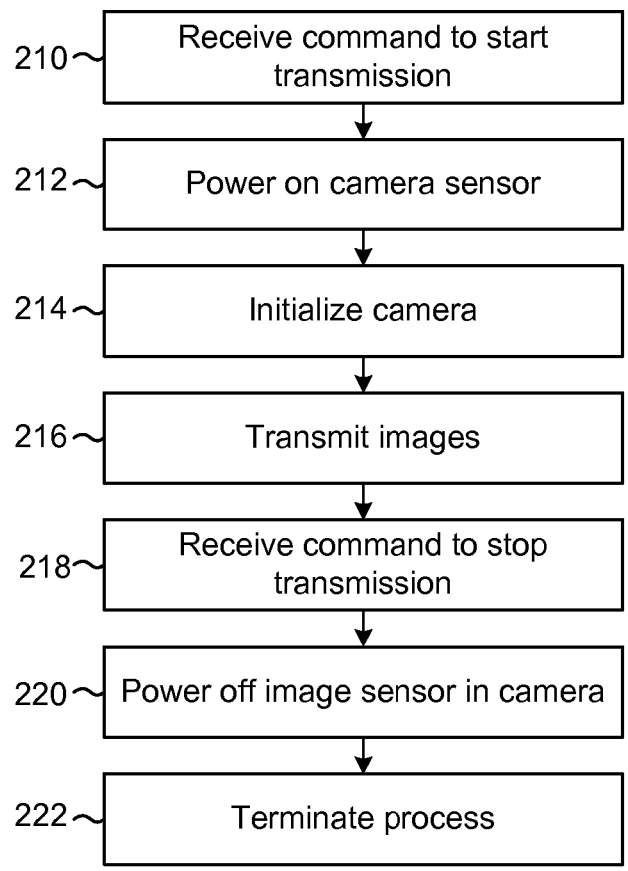

FIG. 2B illustrates a flowchart illustrating an example method for continuous transmission of images. A camera may receive (210) a command to start transmission, such as the start command 206 described above. In response to the command, the camera may power on (212) a camera sensor and may initialize (214) the camera. After initializing the camera, the camera may transmit (216) images continuously. At a later point in time, the camera may receive (218) a command to stop transmission. In response to the command to stop transmission, the camera may power off (220) the image sensor in the camera and may terminate (222) the image capture process. Thus, there is a slight delay required to initialize the camera between receiving the start command and transmission of images, and the camera continues to transmit images until the camera receives the command to stop transmission.

FIG. 2C illustrates an example of a timing chart associated with continuous transmission of images. Upon receiving a start command signal 230, the camera may perform initialization 234 and then transmit images during transmission 236 until receiving a stop command signal 232. While the voltage supply 238 remains high all the time, a voltage signal 240 to select components (e.g., components associated with the camera, including the image sensor) is high between receiving the start command signal 230 and receiving the stop command signal 232. In addition to the power consumption associated with the voltage signal 240, the camera continues to generate and transmit images during the transmission 236, resulting in increased memory usage. While not illustrated in FIG. 2C, signals 230-236 are repeated each time the camera is used to capture an image.

Figure 3A:
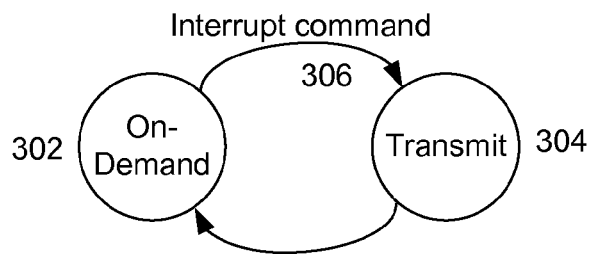
FIGS. 3A-3C illustrate examples of a state diagram, a flowchart and a timing chart used for discontinuous transmission of images according to embodiments of the present disclosure.

FIG. 3A illustrates an example of a state diagram according to a discontinuous mode of the present disclosure. FIG. 3A is intended to convey a broad example of a state diagram, and the camera 106 may include additional states that are not illustrated in FIG. 3A without departing from the present disclosure. When the camera 106 is powered on but not transmitting images, the camera 106 is in an "on-demand"

state 302. The "on-demand" state 302 corresponds to the waiting state of the discontinuous mode. The camera 106 and related components may be initialized and enabled to quickly capture images, but non-essential, on-demand components, such as the MIPI clock and functional blocks within the camera 106, may be disabled or powered off. Further, during the "on-demand" state 302, the camera is not capturing, processing or transmitting images. Therefore, the camera 106 has low power consumption while in the "on-demand" state 302. Upon receiving an interrupt command 306, the camera 106 may switch to a "transmit" state 304. Unlike the continuous transmission described above with regard to FIG. 2A, the camera 106 remains in the "transmit" state 304 long enough to capture, process and transmit a number of images in a series before reverting to the "on-demand" state 302. Therefore, the on-demand components may be enabled or powered on for a short period of time to capture, process and transmit the series of images and then disabled or powered off again.

Figure 3B:
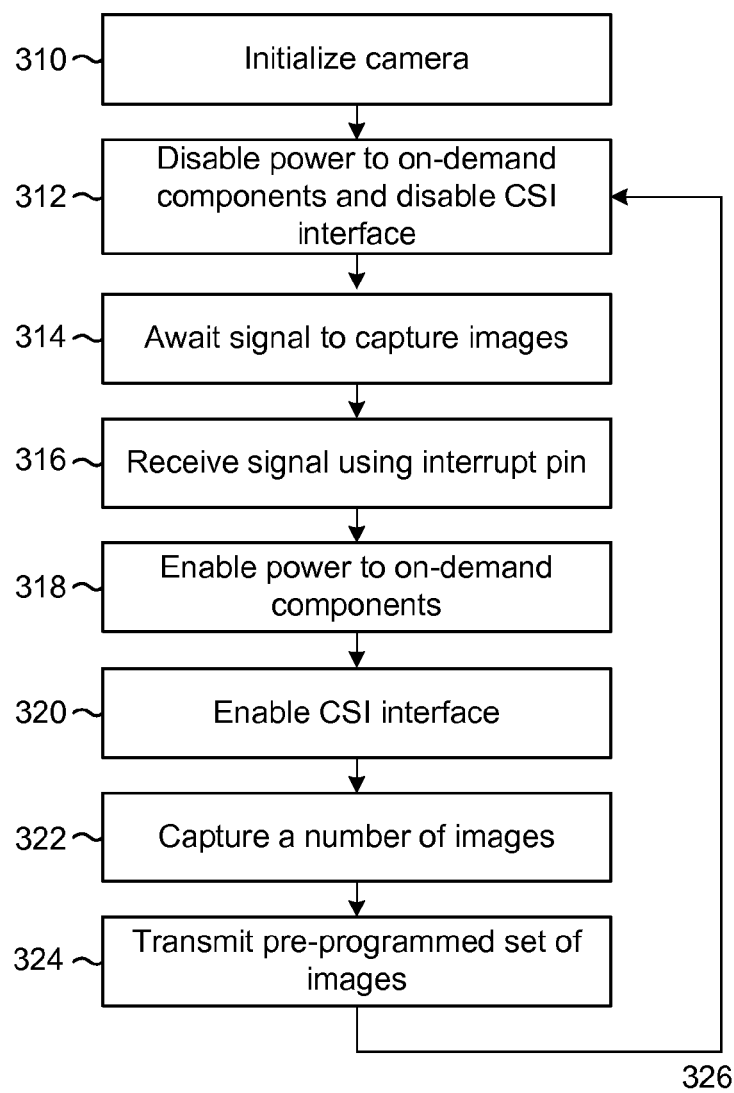

FIG. 3B illustrates a flowchart illustrating an example method for discontinuous transmission of images according to embodiments of the present disclosure. The device 102 may initialize (310) a camera, establishing settings for image capture and setting registers accordingly. For example, the device 102 may prepare the camera 106 to capture images, such as by setting an exposure, a frame rate, a resolution, a data format, and/or other settings for capturing images. The device 102 may then disable (312) power to on-demand components associated with the camera 106 and disable components associated with a camera interface (e.g., CSI interface). While FIG. 3B illustrates steps 310 and 312 as discrete steps, the camera 106 may disable some or all of the on-demand components as part of the initialization performed in step 310 without departing from the disclosure. The on-demand components are components associated with the camera 106 that are not required until the camera 106 is capturing, processing and transmitting images, and may therefore be disabled by storing setting values to registers, gating the registers and removing power to the on-demand components. As will be described below with regard to FIG. 4, the on-demand components may include image signal processing (ISP) functionality (e.g., lens correction, pixel correction or the like), a phase-locked loop (PLL) clock, functional blocks within the camera 106 or related circuitry, and/or circuitry or components associated with a Camera Serial Interface (CSI), which was created by the Mobile Industry Processor Interface (MIPI) alliance. The CSI or MIPI interfaces may include MIPI data signals and/or a MIPI clock signal (e.g., a MIPI Phase Locked Loop (PLL)). The device 102 may then await (314) a signal to capture images in an on-demand state.

At a later point in time, the device 102 may receive (316) a signal to capture images, which may be received using an interrupt pin. The signal may be sent from a host processor within the device 102 to the camera 106 based on user input (e.g., a user pushing a button), detected motion (e.g., movement of the device 102 being detected by an accelerometer or the like) or a request from an application (e.g., an application requests images for use in facial recognition or the like), although the disclosure is not limited thereto. In response to the signal, the device 102 may enable (318) power to the on-demand components and enable power to (320) the CSI interface. The device 102 may selectively power on on-demand components and activate the CSI interface, including MIPI data and a MIPI clock, for select image sensors out of multiple image sensors included in the camera 106. For example, the device 102 may include multiple front-facing image sensors and a rear-facing image sensor, and the device 102 may power on on-demand components associated with the rear-facing image sensor and enable the CSI interface only for the rear-facing image sensor.

The device 102 may then capture (322) a number of images in a series with the camera 106 and transmit (324) the series of images from the camera 106 to the host processor within the device 102. As part of capturing an image, the device 102 may perform image processing to process the captured image, such as performing lens correction, dead pixel correction, black level correction, automatic gain correction, automatic exposure correction, geometric distortion correction or the like. The number of images in a series to capture and transmit may be stored as a camera setting and may include any natural number greater than 1. After capturing and transmitting the series of images, the device 102 may loop (326) to step 312 and power off on-demand components and disable the MIPI clock.

Figure 3C:
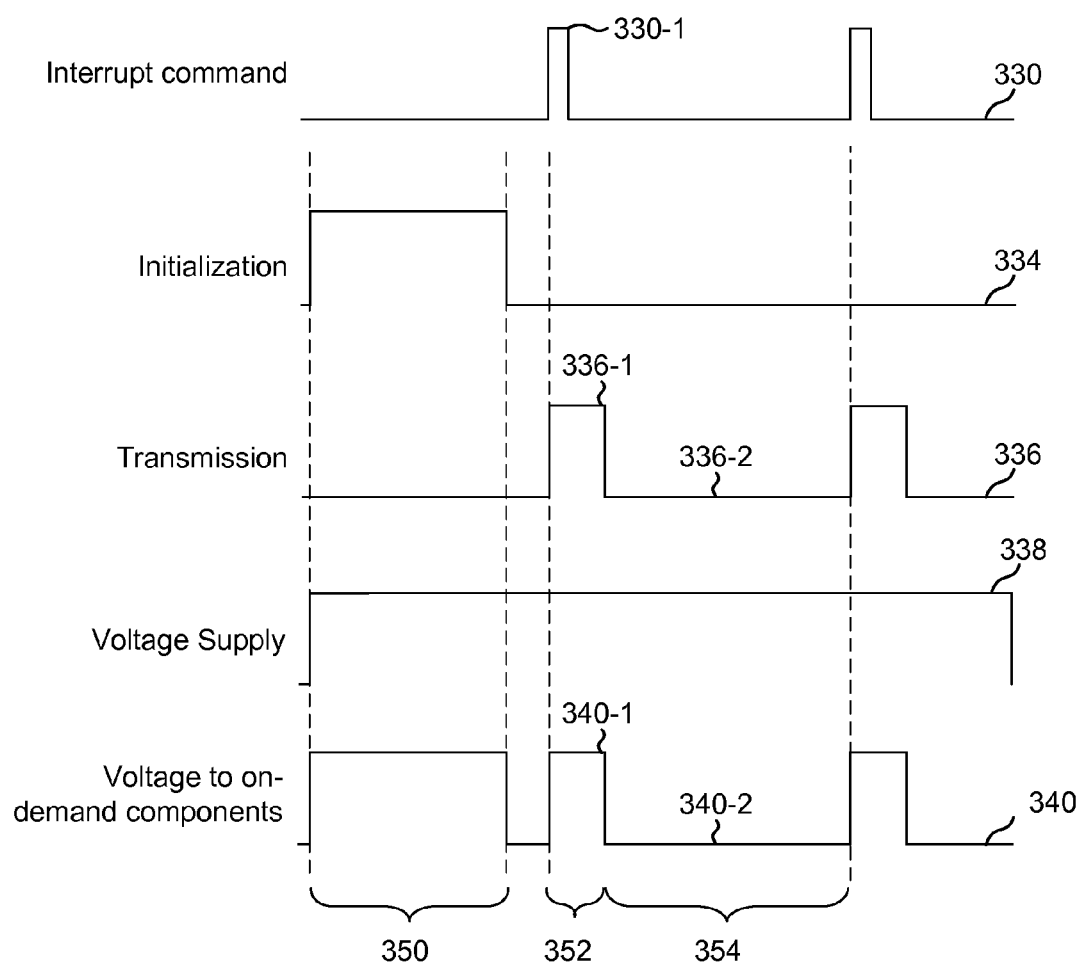

FIG. 3C illustrates an example of a timing chart used for discontinuous transmission of images according to embodiments of the present disclosure. To begin, the device 102 may perform an initialization cycle 350 and prepare the camera 106 for image capture, illustrated by the initialization 334 being high. After the initialization cycle 350 is complete, the camera 106 may receive interrupt commands 330 from a host processor on an interrupt pin. In response to the interrupt commands 330, such as a first interrupt command 330-1, the camera 106 may capture, process and transmit a series of images during a transmission cycle 352, which is illustrated by transmission 336 being high. After completing the transmission cycle 352, the camera 106 may stop capturing, processing and transmitting images during a non-transmission cycle 354 until a following interrupt command 330 is received, which is illustrated by the transmission 336 being low. While a voltage supply 338 for the device 102 remains high all the time, a voltage signal 340 to on-demand components (e.g., non-essential components associated with the camera 106 only required for camera capture, processing and transmission) is powered on to enable the initialization 334 and the transmission 336. Thus, the voltage signal 340 is high while either the initialization 334 or the transmission 336 are high and the voltage signal 340 is low when both the initialization 334 and the transmission 336 are low. For example, the initialization 334 and therefore the voltage signal 340 are high during an initialization cycle 350. Similarly, a transmission cycle 352 may be initiated by the first interrupt command 330-1. In response to the first interrupt command 330-1, the camera 106 may capture, process and transmit a series of images (336-1) during the transmission cycle 352 and then stop capturing, processing and transmitting images (336-2) during the non-transmission cycle 354. Therefore, the voltage signal 340 may be high (340-1) during the transmission cycle 352 and low (340-2) during the non-transmission cycle 354.

As illustrated in FIG. 3C, the camera 106 is only in the transmission cycle 352 for a brief duration while the camera 106 captures and transmits the series of images. Upon completion of the transmission cycle 352, the camera 106 stops transmission of images and sets the voltage signal 340 for on-demand components to be low while awaiting another interrupt command 330. This reduces the power consumption associated with the camera 106 while also reducing a memory usage or bandwidth consumption resulting from continuous transmission of images. In addition, as the initialization 334 is performed prior to the first interrupt command 330-1, a delay between the first interrupt command 330-1 and the transmission 336 being high (336-1) may be reduced by the amount of time required for the initialization cycle 350.

While the discontinuous mode may reduce power consumption associated with using the camera 106, a user of the device 102 may require constantly streaming images to frame a picture prior to capturing a desired image, which may be referred to as a normal mode. In contrast to the normal mode, the discontinuous mode of the camera 106 only captures and transmits a series of images and then stops capturing and transmission of images. This discontinuous mode is beneficial for applications that perform image processing in a background of the device 102, as it reduces a power consumption associated with the image processing. For example, applications may use image processing for facial recognition, facial tracking, eye tracking, glare compensation, gaze tracking, environment mapping or the like.

The applications may interact with other components in the device 102 to determine when to capture a series of images. For example, a first application may use gyros or accelerometers to determine if the device 102 is in motion and may request that the camera 106 capture a series of images based on the motion. Alternatively, a second application may request that the camera 106 capture a series of images based on an input on an external button, allowing a user to capture an image with a reduce latency between the input and the image capture or without requiring the device 102 to turn on the display 104.

While FIG. 1 illustrates the camera 106 as a single front-facing image sensor, the camera 106 may include multiple image sensors. For example, the device 102 may include one or more front-facing image sensors and/or one or more rear-facing image sensors that may be collectively referred to as the camera 106 for ease of explanation. The image sensors may be controlled by one or more image processors or vision processors using a camera interface, and the vision processors may be controlled by a host processor or application processor. Each of the image sensors may be associated with certain components in the camera 106 and the camera 106 may selectively enable these components to use an individual image sensor. For example, applications may select an image sensor based on an input, such as a first application capturing an image with a front-facing image sensor for facial recognition or a second application capturing an image with a rear-facing image sensor upon detecting movement of the device 102.

Figures 4A, 4B:
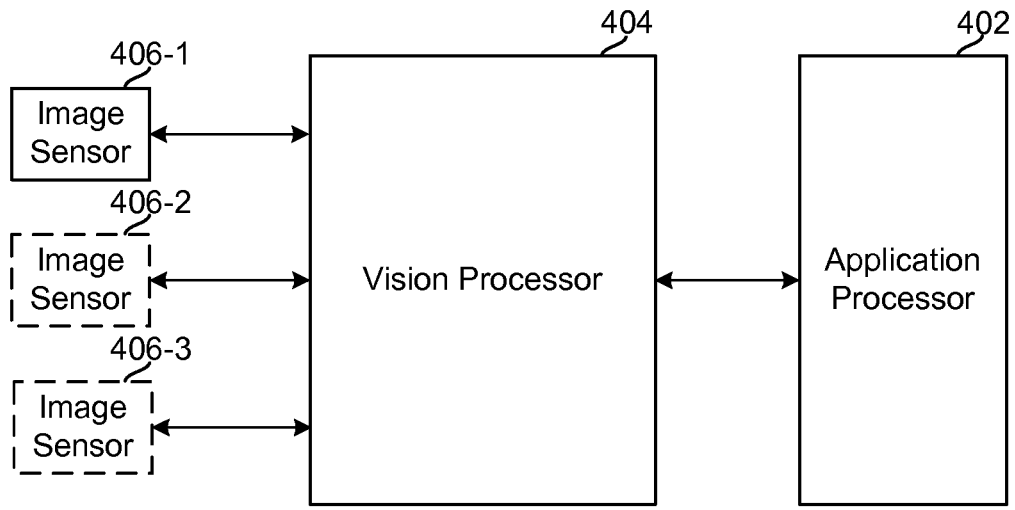
FIGS. 4A-4B are example block diagrams illustrating example components associated with a camera according to embodiments of the present disclosure.

FIGS. 4A-4B are example block diagrams illustrating example components associated with a camera 106 according to embodiments of the present disclosure. As illustrated in FIG. 4A, the camera 106 may include an application processor 402, which may be referred to as a host processor, along with a vision processor 404, a first image sensor 406-1 and optional additional image sensors 406, illustrated by a second image sensor 406-2 and a third image sensor 406-3. In some examples, the camera 106 may include a single vision processor 404 configured to control multiple image sensors 406. However, the present disclosure is not limited thereto, and the camera 106 may include multiple vision processors 404, each vision processor 404 configured to control one or more image sensors 406.

After initialization, the image sensors 406 may be in an on-demand state 302, where a power consumption of the image sensors 406 is reduced but the image sensors 406 are waiting for a trigger to capture a number of frames. To further reduce power consumption, some or all of the image sensors 406 may be disabled in the on-demand state 302, but the disclosure is not limited thereto. To receive an interrupt command 306, each of the image sensors 406 may include an interrupt pin. The interrupt pins may be triggered in several different configurations. As a first example, the interrupt pins may be coupled to a single trigger so that each of the image sensors 406 capture and transmit the number of frames at the same time. As a second example, image sensor(s) 406 on a front of the device 102 may be coupled to a first trigger while image sensor(s) 406 on a back of the device 102 may be coupled to a second trigger. Triggering the first trigger results in each of the image sensor(s) 406 on the front of the device 102 capturing and transmitting the number of frames at the same time, while triggering the second trigger results in each of the image sensor(s) 406 on the back of the device 102 capturing and transmitting the number of frames at the same time. As a third example, each of the interrupt pins may be coupled to a unique trigger so that the image sensors 406 are controlled individually. In addition, the device 102 may use the first example, the second example, the third example or a combination thereof to trigger the image sensors 406.

As illustrated in FIG. 4B, additional signals/components associated with the camera 106 may include voltage rails 410, functional blocks 412, MIPI data signals 414, MIPI clock signals 416, registers 418 and Image Signal Processing 420. These additional components (e.g., functional blocks 412, registers 418, image signal processing 420 and components configured to generate the MIPI data signals 414 and MIPI clock signals 416) may be included in the application processor 402, the vision processor 404 and/or other circuitry associated with the camera 106 not illustrated in FIG. 4A. While FIG. 4B illustrates MIPI data 414 and MIPI clock 416, the disclosure is not limited thereto and other camera interface circuitry, protocols, specifications and/or signals may be substituted without departing from the present disclosure. For example, camera interface circuitry may operate using specifications/protocols such as MIPI CSI (e.g., CSI, CSI2, CSI3 or the like), Advanced Configuration and Power Interface (ACPI), Inter-Integrated Circuit (I2C), Universal Serial Bus (USB) or the like.

Examples of camera interface circuitry may include transmitters, receivers and/or transceivers associated with the application processor 402 and/or vision processor 404. For example, to allow data to be transmitted from the vision processor 404 to the application processor 402, the vision processor 404 may include or be coupled to an image transmitter and the application processor 402 may include or be coupled to a receiver. Some or all of the circuitry associated with the camera interface (e.g., transmitters, receivers, transceivers, clock circuitry or the like) may be identified as on-demand components and therefore disabled in the discontinuous mode when the camera 106 is not capturing, processing and transmitting images to reduce power consumption.

The functional blocks 412 may include controls, readouts (e.g., circuitry configured to read data from each photodiode in an image sensor), analog to digital converters (ADC) or other circuitry included within the camera 106. As the readouts and ADC's are only required to output analog data from photodiodes and convert the analog data to digital data, they can be disabled when the camera 106 is not capturing and transmitting images.

The MIPI clock 416 may be a MIPI Phase Locked Loop (PLL), which is separate from an input PLL received by the camera 106 and other internal clocks that may be used by individual circuitry included in the camera 106. For example, the input PLL may be used to generate the MIPI clock 416 and/or the other internal clocks and is not disabled during the non-transmission cycle 354, whereas the MIPI clock 416 and/or some of the other internal clocks may be disabled during the non-transmission cycle 354 along with the on-demand components.

The registers 418 may include a block of registers and/or discrete registers and each camera setting may be stored to a separate register. In addition, important data stored in the on-demand components may be stored in the registers 418 while the on-demand components are disabled so that the important data may be reloaded in the on-demand components upon being enabled. While some of the registers 418 remain powered on during the non-transmission cycle 354, some of the registers 418 (e.g., registers on separate power islands) may only be necessary during capturing, processing and transmission of images and may therefore be powered off when not in use.

The image signal processing 420 may include circuitry or functional blocks configured to process captured images, such as by performing lens correction, dead pixel correction, black level correction, automatic gain correction, automatic exposure correction, geometric distortion correction or the like. The image signal processing 420 may be enabled or disabled based on specific settings set by the device 102 and/or user preferences. Thus, some of the image signal processing 420 may remain disabled during capturing, processing and transmission of images.

As shown in FIG. 4B, the voltage rails 410 may be always on while the device 102 is on, providing power to the device 102. The registers 418 may be initialized to stream N frames, where N is a natural number stored in the device 102, during the initialization cycle 350 described above. The registers 418 may be modified during the initialization cycle 350 or by changing camera settings for the camera 106 during a non-transmission cycle 354. For example, a first application may use first camera settings for the camera 106 while a second application may use second camera settings for the camera 106, so the device 102 may modify the registers 418 based on whether the first application or the second application is running.

As multiple applications may be running on the device 102, the device 102 may prioritize particular applications or may frequently modify the registers 418 to allow for multiple applications to capture images. In addition, a user of the device 102 may manually modify the camera settings to select particular camera settings prior to capturing an image. In some examples, the user may prefer constantly streaming images to the display 104 to allow the user to view what is included in the image and frame the image, so the camera 106 may operate in a normal mode with continuous image transmission or may increase a number of frames captured by the camera 106. In other examples, the user may prefer capturing a short series of images, whether to decrease a delay caused by displaying the images on the display 104 or to reduce a power consumption associated with capturing the images.

To reduce power consumption of the camera 106, the functional blocks 412, MIPI data signals 414, MIPI clock signals 416 and/or image signal processing 420 may be powered off or disabled during the non-transmission cycle 354. After receiving the interrupt command 330 described above with regard to FIG. 3, the functional blocks 412, MIPI data signals 414, MIPI clock signals 416 and/or image signal processing 420 may be powered on or enabled to allow the camera 106 to capture, process and transmit the N frames during the transmission cycle 352.

Figure 5:
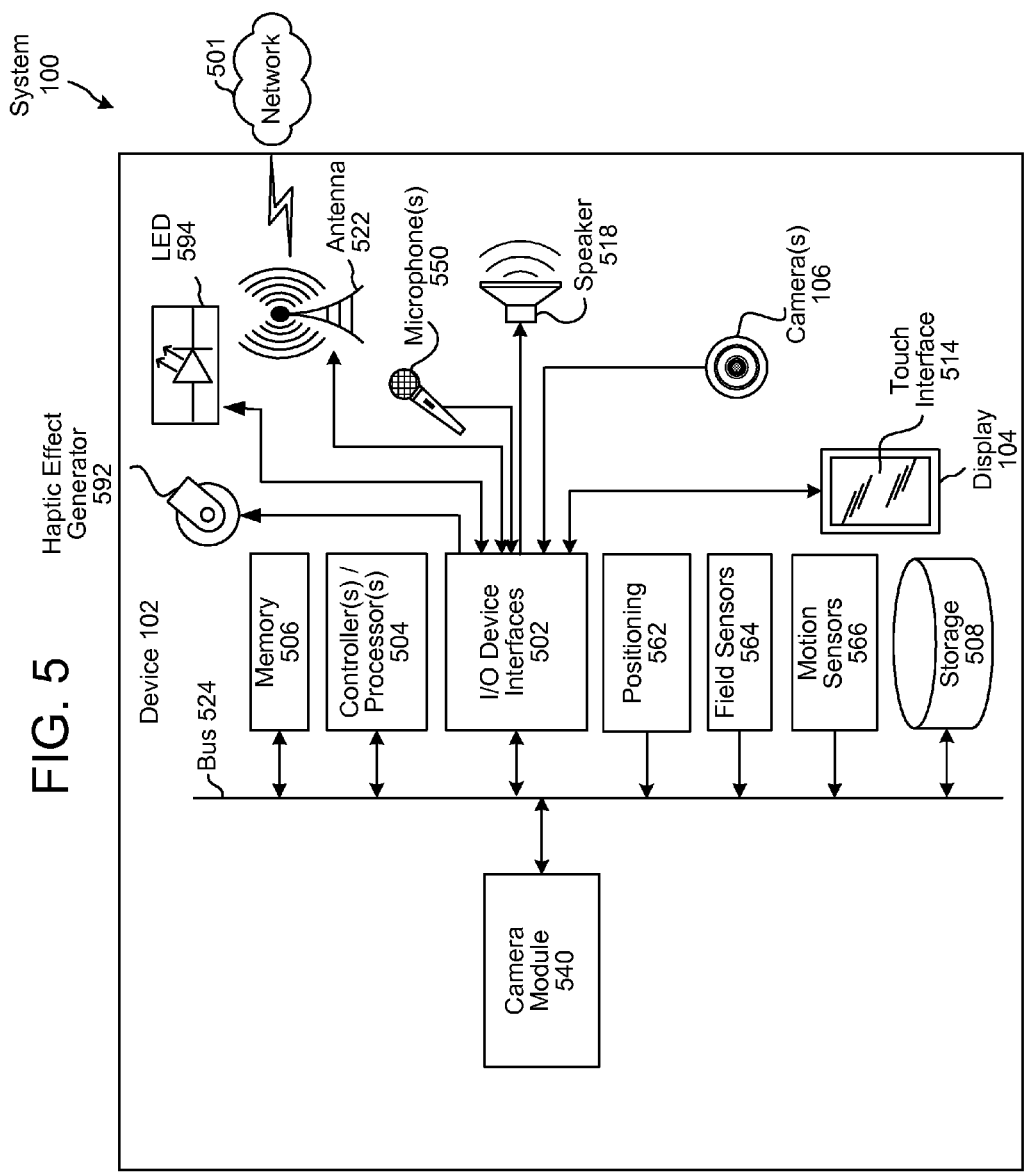
FIG. 5 is an example block diagram conceptually illustrating example components of a device in accordance with various embodiments.

FIG. 5 illustrates a block diagram conceptually illustrating example components of a system 100 to perform the steps described herein. Depending upon how the system 100 is structured, some of components shown in FIG. 5 as part of a device 102 may be included in one or more other devices. In operation, the system 100 may include computer-readable and computer-executable instructions that reside in storage 508 on the device 102. The device 102 may be a mobile device, such as a smart phone, tablet, smart watch, or the like. Alternatively, the device 102 may be a computing device, such as a laptop computer, a television device or incorporated into an automobile, such as a head-up display (HUD) device, without departing from the present disclosure.

The device 102 may include one or more controllers/processors 504 comprising one-or-more central processing units (CPUs) for processing data and computer-readable instructions, and a memory 506 for storing data and instructions. The memory 506 may include volatile random access memory (RAM), non-volatile read only memory (ROM), non-volatile magnetoresistive (MRAM) and/or other types of memory. The device 102 may also include a data storage component 508 for storing data and processor-executable instructions. The data storage component 508 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 502.

Executable instructions for operating the device 102 and its various components may be executed by the controller(s)/processor(s) 504, using the memory 506 as temporary "working" storage at runtime. The executable instructions may be stored in a non-transitory manner in non-volatile memory 506, storage 508, or an external device. Alternatively, some or all of the executable instructions may be embedded in hardware or firmware in addition to or instead of software.

As shown in FIG. 5, the device 102 may include one or more of a variety of sensors. Among the sensors are an audio capture component such as microphone(s) 550, an image and/or video capture component such as camera(s) 106, a touch interface 514, an antenna 522, positioning sensors 562, field sensors 564 (e.g., a 3-axis magnetometer, a gravity sensor), and motion sensors 566 (e.g., a 3-axis accelerometer, a 3-axis gyroscope). The device 102 may also include one or more buttons (not shown). Several of each of these components may be included. Also, although shown as integrated within device 102, some or parts of the various sensors may be external to device 102 (such as AR glasses 102b, wireless headset 1321, etc.) and accessed through input/output device interfaces 502 either wirelessly or through a physical connection.

The input/output device interfaces 502 may be configured to operate with a network 501, for example using an antenna 522 and related components (e.g., radio transmitter/receiver/transceiver, modem, etc.). The network 501 may be a wireless local area network (WLAN) (such as WiFi), Bluetooth, zigbee and/or wireless networks, such as a Long Term Evolution (LTE) network, WiMAX network, 3G network, etc. The network 801 may include a local or private network or may include a wide network such as the internet. Devices may be connected to the network 801 through either wired or wireless connections.

The audio capture component may be, for example, a microphone 550 or array of microphones, a wired headset (not illustrated), a wireless headset (not illustrated), etc. If an array of microphones is included, approximate distance to a sound's point of origin may be performed acoustic localization based on time and amplitude differences between sounds captured by different microphones of the array.

The touch interface 514 may be integrated with a surface of a display 104 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The positioning module 562 provides an interface for acquiring location information, such as information from satellite geographic positioning system(s). For example, the positioning module 562 may include a Global Positioning System (GPS) receiver and/or a Global Navigation Satellite System (GLONASS) receiver. The positioning module 562 may also acquire location-based information using other radio sources (e.g., via antenna 522), such as mapping services that triangulate off of known WiFi service set identifiers (SSIDs) or cellular towers within range of the device 102.

The field sensor module 564 provides directional data. The field sensor module 564 may include a 3-axis magnetometer that measures magnetic fields and may serve as a compass. The field sensor module 564 may also include a dedicated gravity sensor to determine up-and-down.

The motion sensor module 566 provides inertial data, and may include 3-axis accelerometer and a 3-axis gyroscope.

Examples of other sensors that may be configured on the device include an electronic thermometer to measure ambient temperature and a proximity sensor to detect whether there is an object within a certain distance of the device 102.

Sensors may be communicatively coupled with other components of system via input/output (I/O) device interfaces 502 and/or via an address/data bus 524. The address/data bus 524 conveys data among components of the device 102. Each component within the device 102 may also be directly connected to other components in addition to (or instead of) being connected to other components across the bus 524.

The I/O device interfaces 502 may connect to a variety of components and networks. Among other things, the I/O device interfaces 502 may include an interface for an external peripheral device connection such as universal serial bus (USB), FireWire, Thunderbolt or other connection protocol. The input/output device interfaces 502 may also support a variety of networks via an Ethernet port and antenna 522.

The device 102 may also include a video output component for displaying images, such as display 104. The video output component may be a display of any suitable technology, such as a liquid crystal display, an organic light emitting diode display, electronic paper, an electrochromic display, a pico projector, etc. The video output component may be integrated into the device 102 or may be separate.

The device 102 may also include an audio output component such as a speaker 518, a wired headset (not illustrated), or a wireless headset (not illustrated). Other output devices include a haptic effect generator 592. The haptic effect generator may be of any haptic technology, including technologies to vibrate the entire device 102 (e.g., electromagnetic technologies such as vibratory motor or a coil with a central mass) and/or may comprise technologies allowing the haptic effect to be localized to a position of the touch interface 514, such as electroactive polymers, piezoelectrics, electrostatics, subsonic audio wave surface actuation, etc. The device may also include an LED 594 or other light emitting component to provide other visual feedback to a user other than that provided through display 104.

As discussed above, device 102 includes controller(s)/processors 504, memory 506, and storage 508. In addition, the device 102 may include a camera module 540, which may comprise processor-executable instructions stored in storage 508 to be executed by controller(s)/processor(s) 504 (e.g., software, firmware), hardware, or some combination thereof. For example, components of the camera module 540 may be part of a software application running in the foreground and/or background on the device 102. The camera module 540 may utilize the camera(s) 106 (or other components) and may control the device 102 as discussed above, for example with regard to FIGS. 1, 2B and 3B.

As noted above, depending upon how the system is structured, other components not shown in FIG. 5 may be included as part of the device 102 and certain components shown in FIG. 5 as part of a device 102 may be included in one or more other devices. For example, devices may include multiple components not illustrated in FIG. 5 without departing from the present disclosure. The specification and drawings are, accordingly, to be regarded in an illustrative rather than a restrictive sense. It will, however, be evident that various modifications and changes may be made thereunto without departing from the broader spirit and scope of the invention as set forth in the claims.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. An electronic device comprising:
  a camera including a first image sensor;
  a processor coupled to the camera;
  camera interface circuitry coupled to the processor and the camera, the camera interface circuitry including clock circuitry and a transmitter and configured to transmit image data from the first image sensor to an image processor;

image signal processing circuitry coupled to the processor and configured to process image data to remove distortion; and read-out circuitry coupled to the processor and configured to acquire the image data from the first image sensor; and wherein the electronic device is configured to:
  enable the camera;
  place the camera into a discontinuous mode, wherein the camera captures a number of images upon receiving an interrupt command while in the discontinuous mode;
  determine camera settings of the camera, wherein the camera settings comprise one or more of exposure, frame rate, resolution, data format and the number of images;
  store each of the camera settings to one of a plurality of registers associated with the camera;
  disable power to the camera interface circuitry, the image signal processing circuitry and the read-out circuitry while providing power to the first image sensor and the plurality of registers, wherein disabling the power to the camera interface circuitry, the image signal processing circuitry and the read-out circuitry further comprises disconnecting the camera interface circuitry, the image signal processing circuitry and the read-out circuitry from a voltage supply;
  receive the interrupt command on an interrupt pin of the first image sensor, the interrupt command triggering the first image sensor to capture image data;
  enable power to the camera interface circuitry, the image signal processing circuitry and the read-out circuitry;
  capture the image data using the stored camera settings;
  transmit the image data from the camera to a processor of the electronic device; and
  disable power to the camera interface circuitry, the image signal processing circuitry and the read-out circuitry without disabling power to the first image sensor after transmitting the image data.

2. The electronic device of claim 1, further comprising a second image sensor and wherein the electronic device is configured to:
  enable the camera interface circuitry and the read-out circuitry for the first image sensor and disable the camera interface circuitry and the read-out circuitry for the second image sensor; and
  capture the image data using the first image sensor.

3. The electronic device of claim 1, wherein the read-out circuitry is further configured to acquire first analog data from the first image sensor and wherein the electronic device further comprises analog to digital converter circuitry configured to convert the first analog data to the image data.

4. The electronic device of claim 1 further configured to:
  receive motion data from an accelerometer of the electronic device;
  determine that the electronic device has moved more than a threshold; and
  transmit the interrupt command to the first image sensor.

5. A computer-implemented method, comprising:
  enabling power to a first camera of an electronic device, the first camera including:
    first components including clock circuitry and a transmitter;
    a first image sensor; and
    second components including an image processor;
  disabling power to the first components without disabling power to the second components;
  receiving a signal;
  enabling power to the first components;
  capturing image data using the first image sensor;
  transmitting the image data from the first camera to a processor of the electronic device; and
  after the transmitting, disabling power to the first components without disabling power to the first image sensor, wherein disabling the power to the first components comprises disconnecting the first components from a voltage supply.

6. The computer-implemented method of claim 5, wherein receiving the signal comprises:
  receiving the signal by the first camera on an interrupt pin of the first image sensor.

7. The computer-implemented method of claim 5, wherein the first components include image signal processing circuitry configured to process the image data to remove distortion.

8. The computer-implemented method of claim 5, wherein the electronic device includes a second camera, the second camera comprising a second image sensor, and the computer-implemented method further comprises:
  enabling the clock circuitry for the first image sensor and disabling the clock circuitry for the second image sensor; and
  capturing the image data using the first image sensor.

9. The computer-implemented method of claim 5, further comprising:
  determining camera settings of the first camera prior to disabling power to the first components, wherein the camera settings comprise one or more of exposure, frame rate, resolution, data format and a number of images to capture upon receiving an interrupt command;
  storing the camera settings to one of a plurality of registers associated with the first camera prior to disabling power to the first components;
  retrieving at least a portion of the camera settings from the plurality of registers; and
  capturing, using the first camera, image data for each of the number of images.

10. The computer-implemented method of claim 9, wherein the first components further include:
  readout circuitry configured to read the image data from the first image sensor; and
  analog to digital converter circuitry configured to convert the image data to the image data.

11. The computer-implemented method of claim 5, further comprising:
  transmitting, by the processor, the signal to the first camera in response to a request from an application on the electronic device.

12. The computer-implemented method of claim 5, further comprising:
  detecting movement of the electronic device using at least one motion sensor; and
  transmitting the signal to the first camera.

13. An electronic device, comprising:
  at least one processor;
  a first camera including:
    first components including clock circuitry and a transmitter,
    a first image sensor, and
    second components including an image processor;

a memory device including instructions operable to be executed by the at least one processor to configure the electronic device to:
enable power to the first camera:
disable power to first components without disabling power to second components;
receive a signal;
enable power to the first components;
capture image data using the first image sensor;
transmit the image data from the first camera to another component of the electronic device; and
after the transmitting, disable power to the first components without disabling power to the first image sensor, wherein disabling the power to the first components comprises disconnecting the first components from a voltage supply.

14. The electronic device of claim 13, wherein the first camera receives the signal on an interrupt pin of the first image sensor.

15. The electronic device of claim 13, wherein the first components include image signal processing circuitry configured to process the image data to remove distortion.

16. The electronic device of claim 13, wherein the electronic device includes a second camera, the second camera comprising a second image sensor, and wherein the instructions further configure the electronic device to:
enable the clock circuitry for the first image sensor and disable the clock circuitry for the second image sensor; and
capture the image data using the first image sensor.

17. The electronic device of claim 13, wherein the instructions further configure the electronic device to:

determine camera settings of the first camera prior to disabling power to the first components, wherein the camera settings comprise one or more of exposure, frame rate, resolution, data format and a number of images to capture upon receiving an interrupt command;
store the camera settings to one of a plurality of registers associated with the first camera prior to disabling power to the first components;
retrieve at least a portion of the camera settings from the plurality of registers prior to capturing the image data; and
capturing, using the first camera, image data for each of the number of images.

18. The electronic device of claim 17, wherein the first components further include:
readout circuitry configured to read the image data from the first image sensor; and
analog to digital converter circuitry configured to convert the image data to the image data.

19. The electronic device of claim 13, wherein the instructions further configure the electronic device to:
transmit, by the at least one processor, the signal to the first camera in response to a request from an application on the electronic device.

20. The electronic device of claim 13, wherein the electronic device further comprises at least one motion sensor and the instructions further configure the electronic device to:
detect movement of the electronic device using the at least one motion sensor; and
transmit the signal to the first camera.

* * * * *